March 21, 1933.   E. THOMSON   1,902,471
ELECTROMAGNETIC CLUTCH
Filed Sept. 3, 1929

Inventor:
Elihu Thomson,
by Charles E. Tullar
His Attorney.

Patented Mar. 21, 1933

1,902,471

UNITED STATES PATENT OFFICE

ELIHU THOMSON, OF SWAMPSCOTT, MASSACHUSETTS, ASSIGNOR TO GENERAL ELECTRIC COMPANY, A CORPORATION OF NEW YORK

ELECTROMAGNETIC CLUTCH

Application filed September 3, 1929. Serial No. 389,891.

My invention relates to electromagnetic clutches, and has for its object the provision of a reliable and efficient clutch wherein provision is made for a controllable amount of slip between the clutch parts to give a variable driving ratio.

While obviously having general application in power drive systems wherein clutches are utilized, my invention has particular application in the driving of looms both collectively by a single motor and individually by means of a separate driving motor for each loom. It has been found that substantial speed variations, such as up to 10 or 20% of full running speed, are desirable in loom drives, particularly for the purpose of speed adjustment to give the maximum output. It is one of the objects of my invention to provide for these variations in speed in a clutch mechanism, so that a substantially fixed speed driving motor, such as a three phase induction motor, may be used.

In carrying out my invention in one form I provide a polyphase alternating current winding on the clutch and control the slip in the clutch to give a variable driving ratio by means of a rheostat in one of the phases. This rheostat may be adjusted to vary the energization of that phase or to open the circuit through that phase to provide for single phase operation and a still lower driving rate. My invention also comprehends improved and automatic means for effecting this control, for example by means of a speed responsive device whereby the speed of the driven device is regulated and maintained at a predetermined value. I have also provided closed circuit windings on the co-operating clutch part for further increasing the efficiency of the clutch, together with a system of a electrical connections for the various clutches of a multiple unit loom drive.

Figure 1:
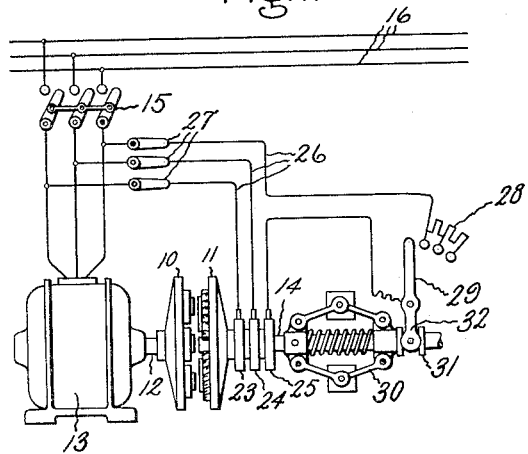
Figure 5:
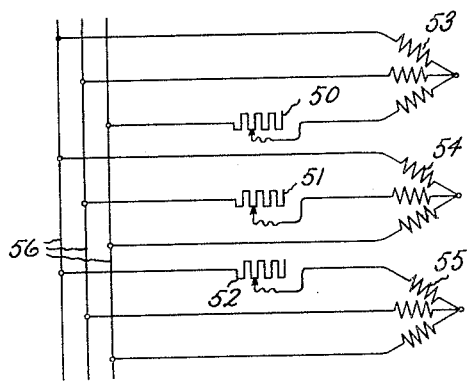
Figure 2:
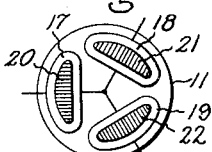
Figure 3:
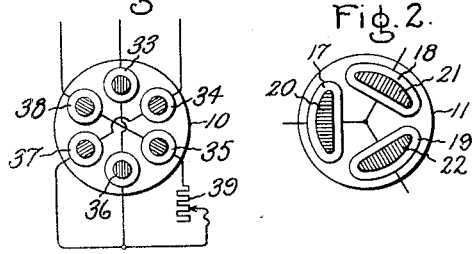
Figure 4:
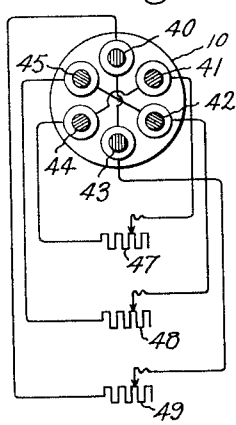
Figure 6:
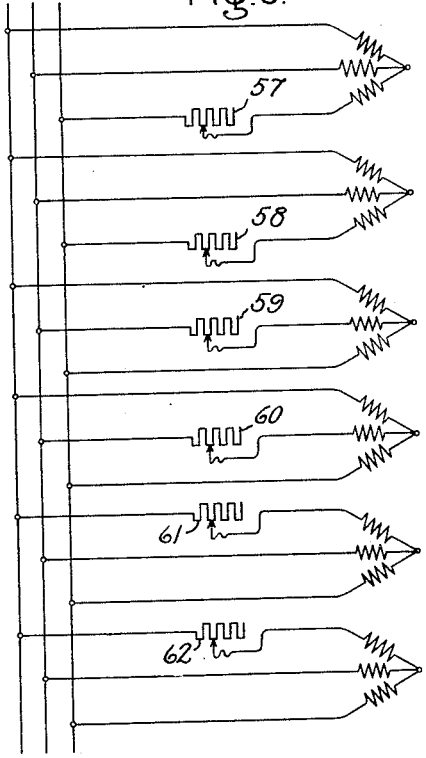

For a more complete understanding of my invention reference should be had to the accompanying drawing, Fig. 1 of which is a diagrammatic view of an electromagnetic clutch embodying my invention, Figs. 2 and 4 are fragmentary views showing details of construction of the clutch shown in Fig. 1, Fig. 3 is a fragmentary view showing a modified form of my invention, while Figs. 5 and 6 are diagrammatic views showing a system of connections for a plurality of clutches.

Referring to the drawing, I have shown my invention in one form as comprising two metallic clutch disks 10 and 11 constituting clutch members, having oppositely disposed faces and mounted respectively on the shaft 12 of the driving motor 13 and on the driven shaft 14 which it will be understood is connected to the apparatus to be driven, such as a loom. As shown, the two shafts 12 and 14 are mounted with their axes of rotation in coincidence so that the adjacent faces of the disks 10 and 11 are in parallel relation. They may run in contact preferably. As indicated, the motor 13 is of a three phase induction type and may be energized through a switch 15 from a three phase source of supply 16.

One or both of the disks 10 and 11, constituting parts of a clutch between the driving motor 13 and the driven shaft 14, may be provided with electrical windings in inductive relation with the other disk so as to form an electromagnetic driving connection between the two disks. As shown, the disk 11 is provided with three equally spaced windings 17, 18 and 19 (Fig. 2) which are provided with laminated cores 20, 21 and 22. These three windings are connected in Y to the supply source 16, the connections being effected through slip rings 23, 24 and 25, conductors 26, and switches 27.

In order to control the energization of the windings, and open one phase entirely if desired, so as to thereby control the slip of the clutch and hence its driving ratio, a variable rheostat 28 is connected in series with one of the windings 17, 18 or 19. As shown, this resistance is connected in one of the conductors 26. It is provided with a pivoted contact arm 29 by means of which the amount of resistance included in circuit may be varied as desired or the circuit opened for single phase operation. In order that this control of the resistance may be automatic and responsive to the speed of the driven shaft I provide a centrifugal governor device 30 on the driven shaft 14, which device acts in response to the speed of the shaft to move a collar 31 on the shaft. This collar is connected to the switch arm 29 by means of an extension 32 on the lower end of the switch arm which embraces the collar.

With the driving motor and the driven shaft at rest as shown in the drawing, the switch arm is preferably actuated to an open circuit position as shown. When the motor is started by closing the switch 15, the clutch may also be energized through the connections previously described including the switch 27 and the conductors 26 whereby the two disks 10 and 11 are electromagnetically coupled together, or if desired the clutch may be energized by means of the switch 27 after the motor has come up to speed. Since one phase of the clutch circuit is open at the resistance 28, the remaining two windings of the clutch are at first connected together in series across one phase of the supply circuit. Under these conditions the electromagnetic connection between the disks 10 and 11 will be greatly reduced, and a relatively large amount of slip will take place during each cycle while the instantaneous value of the current is low. If desired an additional resistance may be inserted in series with the two windings to still further reduce their energization and hence still further increase the range of instantaneous current values at which slip occurs. This, of course, increases the slip, and by varying the resistance the slip can be controlled. A reduced driving rate of starting may thus be obtained, and as the speed of the driven shaft increases the centrifugal device acts to close the circuit for the remaining phase, the circuit being at first closed with the resistance 28 entirely cut out. This applies the polyphase synchronous torque of the windings to hold the clutch members together and thus increases the holding force between them so that the driven shaft is accelerated to a still higher speed. As the acceleration proceeds the resistance 28 is cut in somewhat until a stable shaft speed predetermined by the adjustment of the centrifugal device is reached. Hereafter the speed of the driven shaft 14 will be maintained by the centrifugal device at the predetermined speed for which the centrifugal device is adjusted.

It has been found desirable to adjust the speed of the loom while it is running so as to drive it at the highest practical speed for the particular conditions of operation, whereby the greatest possible output of the loom is obtained, this speed once adjusted being thereafter maintained by the centrifugal device. The speed adjustment while running may be effected by suitable adjusting means in the centrifugal device, and if desired a manually controlled rheostat may be provided in series with the rheostat 28. It will be understood that the motor speed will be higher than the maximum possible running speed of the looms and consequently a speed reduction in the clutch will ordinarily be used to obtain the desired running speed.

While the automatic speed responsive control has been shown in Fig. 1 for the rheostat it will be understood that my invention comprehends manually operated means for controlling the rheostat, and also the operation of the rheostat in response to various other functions. My invention furthermore comprehends various arrangements of the windings on the clutch disks. As shown in Fig. 3, six coils 33 to 38 may be provided each having a laminated iron core. These coils are arranged on the disk so as to be spaced equal distances apart in a circle having for its center the axis of rotation of the driven shaft. They are electrically connected to the three phase supply source, diametrically opposite coils being connected in series, and the three pairs thus formed being connected in Y, a variable resistance 39 being connected in one phase.

In Fig. 4 I have shown an arrangement of windings for the cooperating disk 10. These windings are connected in closed circuits preferably through variable resistances so that currents will be induced in them by the cooperating coils on the disk 11, which currents may be varied by the resistances to control the slip of the clutch. As shown in Fig. 4, six coils 40 to 45 are provided, diametrically opposite coils being connected in series in closed circuits including respectively the variable resistances 47, 48 and 49, which may be arranged for adjustment while the loom is running to vary the driving ratio. These coils are each provided with a laminated iron core.

It will be understood that the driving connection is the friction between the surfaces of the two clutch parts which are held together in mechanical engagement by magnetic attraction, and that slippage occurs when this friction decreases below a predetermined minimum, due to a decrease in the electromagnetic force pressing the two clutch parts together. Where windings and laminated cores are used in both clutch parts, the faces of the laminated cores will of course be arranged to provide contacting clutch surfaces for any relative angular positions of the clutch parts.

In Fig. 5 I have shown an arrangement of connections for the coils of a plurality of clutches such as would be provided in a multiple loom drive. This system of connections involves the feature of connecting the variable resistances of the clutches in different phases of the supply source so that the load will be balanced. As shown, the variable resistances 50, 51 and 52 of the three clutches 53, 54 and 55 are respectively connected in the three phases of the supply source 56.

Fig. 6 shows an arrangement of connections for the resistor where the number of clutches to be connected is an even multiple of the number of the phases of the supply source. In this figure the connections for six clutches are shown, the clutches being connected in groups of two and the resistances in each group being connected to the same phase of the supply source. More specifically, the resistances 57 and 58 are connected to one phase, the resistances 59 and 60 to another phase, while the resistances 61 and 62 are connected to the third phase of the supply source.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. A clutch comprising a pair of members mounted for relative rotation and for mechanical driving engagement with each other, a polyphase winding on one of said members in inductive relation with the other member, means for energizing said winding from a polyphase source of supply whereby said members are clamped together and a variable resistance in circuit with one phase of said winding for independently controlling the energization of said phase to control the slip between said members.

2. The combination with a driving means and a driven device, of a pair of cooperating members driven with said driving means and driven device respectively, said members being arranged for frictional driving engagement with each other, a polyphase winding on one of said members in inductive relation with the other member whereby a frictional driving connection is established between them, a variable rheostat in circuit with one phase of said winding for independently controlling said phase, and means responsive to the speed of said driven device for adjusting said rheostat so as to vary the slip between said members and thereby maintain the speed of said driven device at a predetermined value.

3. A clutch comprising a pair of members mounted for relative rotation and for frictional driving engagement with each other, an alternating current winding on one of said members, a closed circuit winding on the other of said members in inductive relation with the winding in the other of said members, a variable resistance in circuit with said closed circuit winding, and means for varying said resistance to vary the driving ratio between said members.

4. A clutch comprising a pair of members having adjacent faces arranged for frictional engagement with each other, an alternating current winding on one of said members, a variable resistance in circuit with said winding, a closed circuit winding on the other of said members in inductive relation with the other winding, and a variable resistance in circuit with said closed circuit winding.

5. A clutch comprising a pair of members mounted for relative rotation and arranged for frictional engagement with each other, a polyphase winding on one of said members, a variable resistance in circuit with one phase of said winding, means for varying said resistance to independently control said phase, a polyphase closed circuit winding on the other of said members in inductive relation with the other winding, and a variable resistance in circuit with said closed circuit winding.

6. The combination with a plurality of driven devices, of a plurality of polyphase driven motors therefor, electromagnetic clutches connecting said driving motors to said devices, a polyphase winding on each of said clutches, a polyphase supply source for said windings, a variable resistance connected in a circuit of each of said windings, and electrical connections between said windings and said supply source including connections connecting said resistances in different phases of said supply source.

7. The combination in a multiple circuit drive of a plurality of polyphase driving motors, of a clutch for each of said driving units, a polyphase winding for each of said clutches, a polyphase supply circuit for said motor and said clutches, a variable resistance connected in one phase of each of said clutches, and electrical connections between said windings and said supply source so arranged that said resistances are connected to said supply source in groups, the resistances in each group being connected to different phases of said supply source.

8. A variable speed drive comprising a pair of members mounted for a relative rotation and for frictional engagement with each other, a polyphase alternating current winding for one of said members and means for varying the energization of one phase of said winding independently of the remainder of said winding to vary the slip between said members.

9. A variable speed drive comprising a pair of members mounted for relative rotation and for frictional engagement with each other, a polyphase alternating current winding for one of said members and means for opening one phase of said winding independently of the remainder of said winding to vary the slip between said members.

10. A variable speed drive comprising a pair of members mounted for relative rotation and for frictional engagement with each other, a polyphase alternating current winding for one of said members in inductive relation with the other member, a variable resistance in one phase of said winding and means for varying said resistance to independently control the energization of said phase to thereby vary the slip between said members.

11. A variable speed drive comprising a pair of members mounted for relative rotation and for frictional engagement with each other, a polyphase alternating current winding for one of said members in inductive relation with the other member, a variable resistance for independently varying the energization of one phase of said winding, and speed responsive means for varying said resistance.

In witness whereof I have hereunto set my hand this 30th day of August, 1929.

ELIHU THOMSON.